United States Patent
Paradise et al.

(10) Patent No.: US 9,446,315 B2
(45) Date of Patent: *Sep. 20, 2016

(54) DETERMINING GAME SKILL FACTOR

(71) Applicant: Skillz Inc, Boston, MA (US)

(72) Inventors: Andrew Paradise, Boston, MA (US);
Casey Chafkin, Boston, MA (US);
Jason Petralia, Winchester, MA (US);
Peter Winkler, Hanover, NH (US)

(73) Assignee: Skillz Inc, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/536,990

(22) Filed: Nov. 10, 2014

(65) Prior Publication Data

US 2015/0065226 A1  Mar. 5, 2015

Related U.S. Application Data

(63) Continuation of application No. 14/264,570, filed on Apr. 29, 2014, now Pat. No. 8,882,576.

(60) Provisional application No. 61/816,930, filed on Apr. 29, 2013.

(51) Int. Cl.
*A63F 9/24* (2006.01)
*A63F 13/67* (2014.01)
*A63F 13/35* (2014.01)
*A63F 13/798* (2014.01)

(52) U.S. Cl.
CPC ............... *A63F 13/67* (2014.09); *A63F 13/35* (2014.09); *A63F 13/798* (2014.09)

(58) Field of Classification Search
USPC ............................. 473/453; 434/252; 463/31
See application file for complete search history.

(56) References Cited

U.S. PATENT DOCUMENTS

| | | | |
|---|---|---|---|
| 2007/0037623 A1 | 2/2007 | Romik | |
| 2009/0048010 A1 | 2/2009 | Kroeckel et al. | |
| 2009/0325709 A1* | 12/2009 | Shi | 463/42 |
| 2010/0222124 A1* | 9/2010 | Goshen | 463/16 |
| 2013/0165196 A1* | 6/2013 | Kroeckel et al. | 463/7 |

OTHER PUBLICATIONS

International Preliminary Report on Patentability arid Written Opinion issued in Int'l Application No. PCT/US2014/035876 on Nov. 12, 2015.

(Continued)

*Primary Examiner* — Masud Ahmed
(74) *Attorney, Agent, or Firm* — Mintz Levin Cohn Ferris Glovsky and Popeo, P.C.

(57) ABSTRACT

Data characterizing a quantifiable outcome for each of a plurality of game trials can be accessed. Each game trial can be associated with one of a plurality of players and a game. The game can be a digital game played on a computing platform. Using the accessed data, a first variance measure of the quantifiable outcome for all game trials associated with the plurality of players can be computed. For one or more of the plurality of players and using the accessed data, a second variance measure of the quantifiable outcome for the game trials associated with the one or more of the plurality of players can be computed. Based on at least the first variance measure and the second variance measure, a skill factor for the game can be computed. Data characterizing the skill factor can be provided. Related apparatus, systems, techniques, and articles are also described.

20 Claims, 5 Drawing Sheets

(56) References Cited

OTHER PUBLICATIONS

International Search Report issued in Int'l Application No. PCT/US2014/035876 on Oct. 17, 2014.

* cited by examiner

1

DETERMINING GAME SKILL FACTOR

RELATED APPLICATIONS

This application is a continuation application of U.S. patent application Ser. No. 14/264,570 filed Apr. 29, 2014, which claims priority to U.S. Provisional Patent Application No. 61/816,930 filed Apr. 29, 2013, the entire contents of which is hereby expressly incorporated by reference in their entirety.

TECHNICAL FIELD

The subject matter described herein relates to systems, apparatus, methods and articles for determining a skill factor for a digital game.

BACKGROUND

Many digital games require both skill and luck to play well. What does it mean for chance to dominate skill, or vice versa? The extremes of the skill and chance spectrum are relatively easy to identify. For example, a video game that simulates throwing dice is purely a game of chance. Conversely, a video chess game is purely a game of skill Additional examples of games of skill include checkers, billiards, and bowling. By contrast, raffle and roulette are games of pure chance.

However, many games are comprised of a mix of skill and chance. For those cases, the term skill factor or dominant factor relates to an inquiry into the relative proportions of skill and chance. When chance is an integral part that influences the result, chance dominates the game. In other words, for skill to dominate, skill must control the final result and the final result must be within the players control to a certain degree. However, this determination is often subjective, and therefore reasonable minds may differ regarding whether a game outcome is dominated by skill or chance.

SUMMARY

In an aspect, data characterizing a quantifiable outcome for each of a plurality of game trials can be accessed. Each game trial can be associated with one of a plurality of players and a game. The game can be a digital game played on a computing platform. Using the accessed data, a first variance measure of the quantifiable outcome for all game trials associated with the plurality of players can be computed. For one or more of the plurality of players and using the accessed data, a second variance measure of the quantifiable outcome for the game trials associated with the one or more of the plurality of players can be computed. Based on at least the first variance measure and the second variance measure, a skill factor for the game can be computed. Data characterizing the skill factor can be provided.

In another aspect, data characterizing a quantifiable outcome for each of a plurality of game trials can be accessed. Each game trial can be associated with one of a plurality of players and a game. The game can be a digital game played on a computing platform. Using the accessed data, at least two variance measures of the quantifiable outcome for the game trials associated with the plurality of players can be computed. Based on at least the computed variance measures, a dominant factor between skill and chance for the game can be computed. Data characterizing the dominant factor can be provided.

In yet another aspect, data characterizing a request to access digital games of skill can be received. A characterization of two or more digital games of skill can be presented in a graphical user interface. In response to a selection of one of the games, the selected game can be initiated. The games can be classified as games of skill by accessing data characterizing a quantifiable outcome for each of a plurality of game trials. Each game trial can be associated with one of a plurality of players and a game. The game can be a digital game played on a computing platform. Using the accessed data, at least two variance measures of the quantifiable outcome can be computed. Based on the computed variance measures, a dominant factor for the game can be computed. The game can be classified as one of skill when the dominant factor for the game indicates the game is predominately a game of skill.

One or more of the following features can be included in any feasible combination. For example, using the skill factor, whether a dominant factor of game outcome in the game is skill or chance can be determined. The game can be classified as a game of skill or a game of chance. The quantifiable outcome of each game trial can be independent from all other quantifiable outcomes of the plurality of game trials. A confidence level of the skill factor can be determined. A likelihood a classification of the game as a game of skill or a game of chance is incorrect can be determined. The skill factor can be classified as unclassifiable.

Computing the first variance measure can include computing a percentile score. Computing the second variance measure can include computing a percentile score. Computing the first variance measure can include computing a normal distribution. Computing the second variance measure includes computing a normal distribution. Computing the second variance measure can include computing a sample variance. Computing the second variance measure can include computing a weighted average of outcome variances of each of the one or more of the plurality of players. The weights can be based on an amount of trials associated with each player. Determining the game skill factor can be further based on a predetermined skill factor of one or more games known to be purely skill Computing the at least two variance measures can include one or more of: computing a percentile score, computing a normal distribution, and computing a sample variance.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, a game dominant factor can be determined objectively rather than subjectively. The determination can be automatic and further a degree of skill or chance can be determined, rather than merely a classification as purely skill or purely chance. Additionally, a probability that the determination is incorrect can be computed to provide a level of confidence in the determination.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
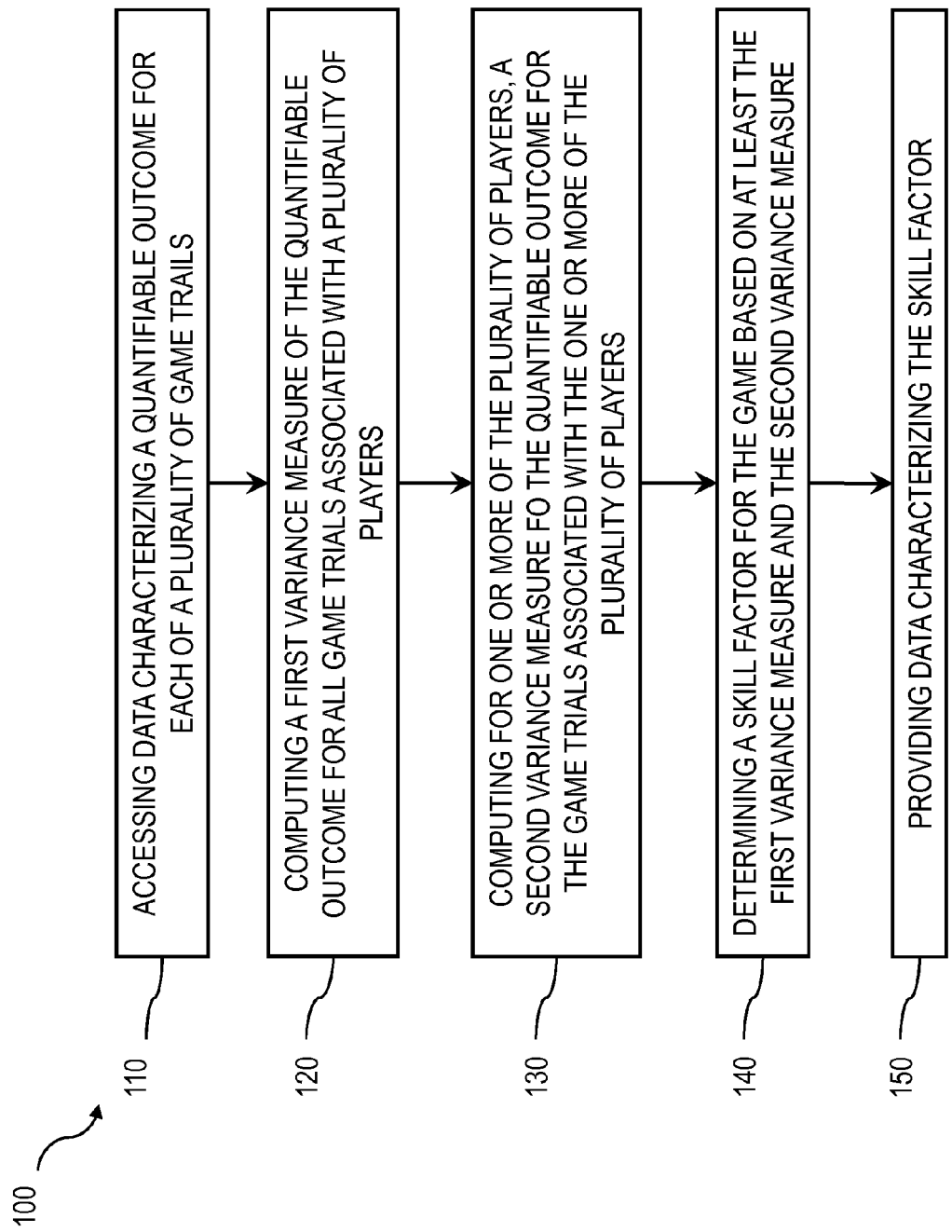
FIG. 1 is a process flow diagram of a process of determining a game skill factor.

FIG. 1 is a process flow diagram 100 of a process of determining a game skill factor. A game skill factor characterizes the degree or factor of player skill that determines game outcome, as compared to chance. Data characterizing a quantifiable outcome for each of a plurality of game trials is accessed at 110. A quantifiable outcome of a game can include a measurable game result (e.g., a score) and each quantifiable outcome can be independent from all other quantifiable outcomes of the plurality of games trials. The game is a digital game played on a computing platform (e.g., video game, computer game, mobile application game, etc.) and each trial is associated with one of a plurality of players. For example, the accessed data can include a plurality of trials, each trial including a score and an identified player. A player can be associated with one or more quantifiable outcomes.

A first variance measure of the quantifiable outcome for all game trials associated with the plurality of players is computed using the accessed data at 120. A second variance measure of the quantifiable outcome for the game trials associated with one or more of the plurality of players is computed using the accessed data at 130. Each variance measure can be a measure of how far a set of numbers (i.e., set of quantifiable outcomes) is spread out. The variance is a parameter describing in part either the actual probability distribution of an observed population of numbers, or the theoretical probability distribution of a not-fully-observed population of numbers. A sample of data from such a distribution can be used to construct an estimate of its variance. A variance measure can be a moment of a distribution.

A skill factor is determined based on at least the first variance measure and the second variance measure at 140. The skill factor is provided at 150. Providing can include transmitting, persisting, displaying, and processing. The skill factor can be used to determine whether a dominant factor of game outcome in the game is skill or chance. The game can be classified as a game of skill, a game of chance, and/or unclassifiable by comparing the dominant factor to a predetermined threshold or a pre-computed threshold. The predetermined threshold can vary based on a definition of a game of skill (e.g., a definition of how much skill should dominate chance). A confidence level of the skill factor or classification can be determined. A likelihood the classification is incorrect can be determined.

Figure 2:
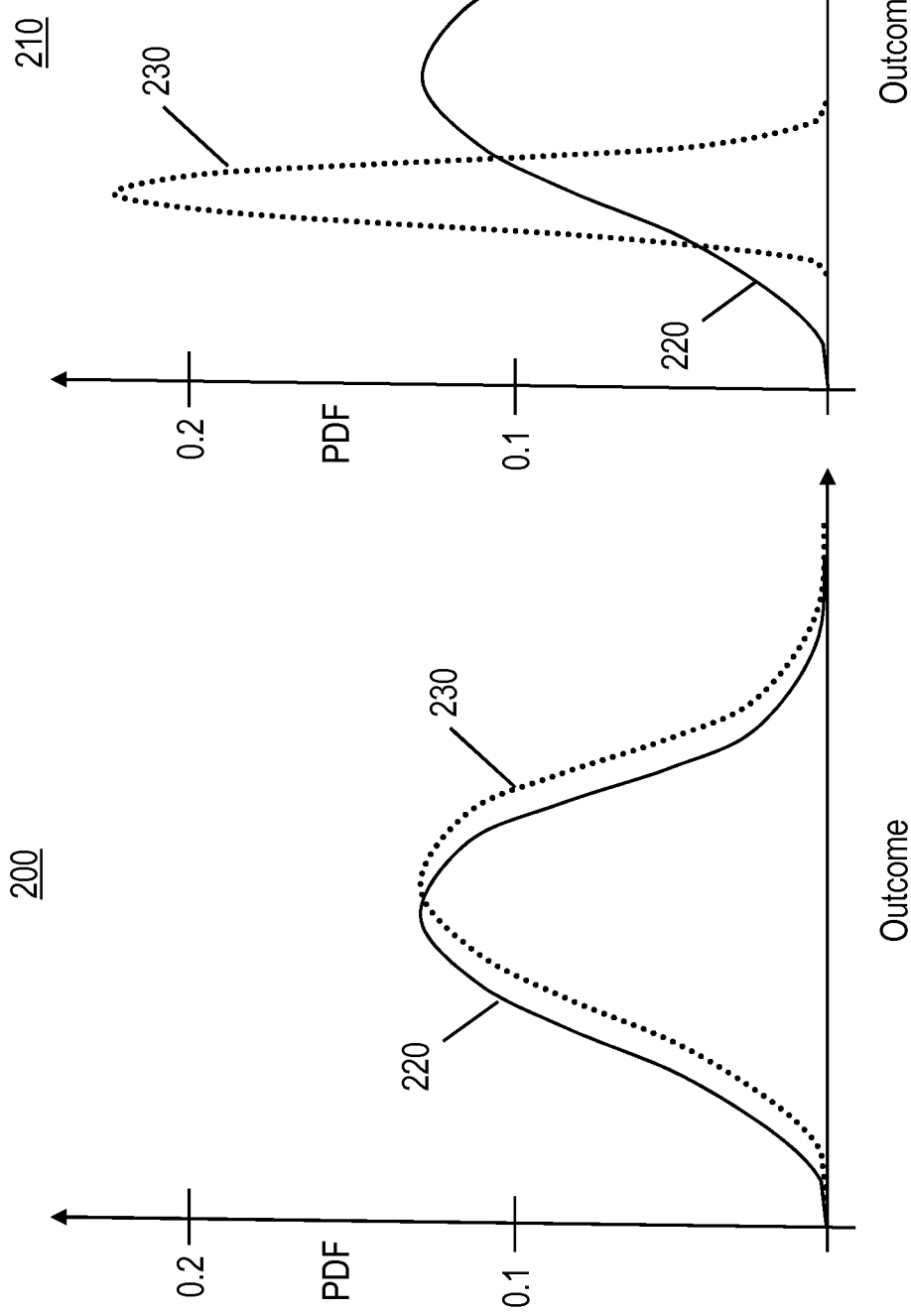
FIG. 2A is a graph illustrating distributions of quantifiable outcomes of an example set of player trials for a game of chance.
FIG. 2B is a graph illustrating distributions of quantifiable outcomes of an example set of player trials for a game of skill.

In a game of pure chance, the quantifiable outcome variation experienced by a single player over many trials will be similar to the quantifiable outcome variation of all trials by all players. FIG. 2A is a graph 200 illustrating distributions of quantifiable outcomes of an example set of player trials for a game of chance. The probability distribution function of quantifiable outcomes for all players 220 (i.e., all trials) is similar to the distribution of quantifiable outcomes for a single player 230 (i.e., all trials associated with a single player). In contrast to a game of chance, if skill were a dominating factor in determining game outcome, the quantifiable outcome variance for trials associated with a single player would be smaller than the quantifiable outcome variance for all trials. The difference in variances can be attributed to variation in skill among different players. FIG. 2B is a graph 210 illustrating distributions of quantifiable outcomes of an example set of player trials for a game of skill The probability distribution function of quantifiable outcomes for all players 220 (i.e., all trials) is similar to that shown in FIG. 2A. However, the distribution of quantifiable outcomes for a single player 230 (i.e., all trials associated with a single player) is different from the distribution 220. Specifically, the variance of the distribution of quantifiable outcomes for a single player 230 is smaller than the variance of the distribution of quantifiable outcomes for all players 220.

Figure 3:
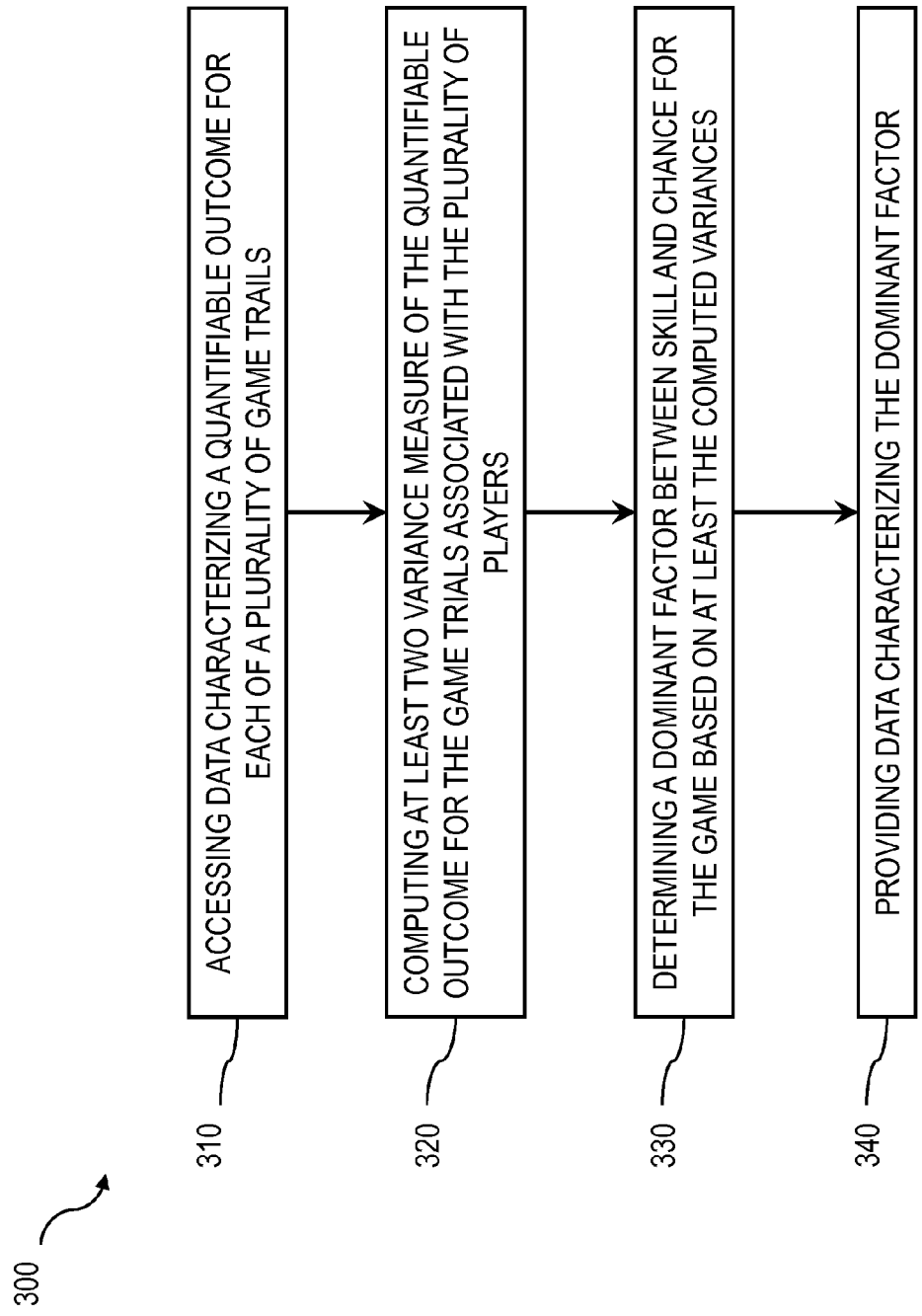
FIG. 3 is a process flow diagram illustrating a process of providing a game dominant factor.

FIG. 3 is a process flow diagram 300 illustrating a process of providing a dominant factor. Data characterizing a quantifiable outcome for each of a plurality of game trials is accessed at 310. At least two variance measures of the quantifiable outcome for the game trials associated with the plurality of players is computed at 320. A dominant factor between skill and chance for the game is determined based at least on the computed variances at 330. Data characterizing the dominant factor is provided at 340.

Figure 4:
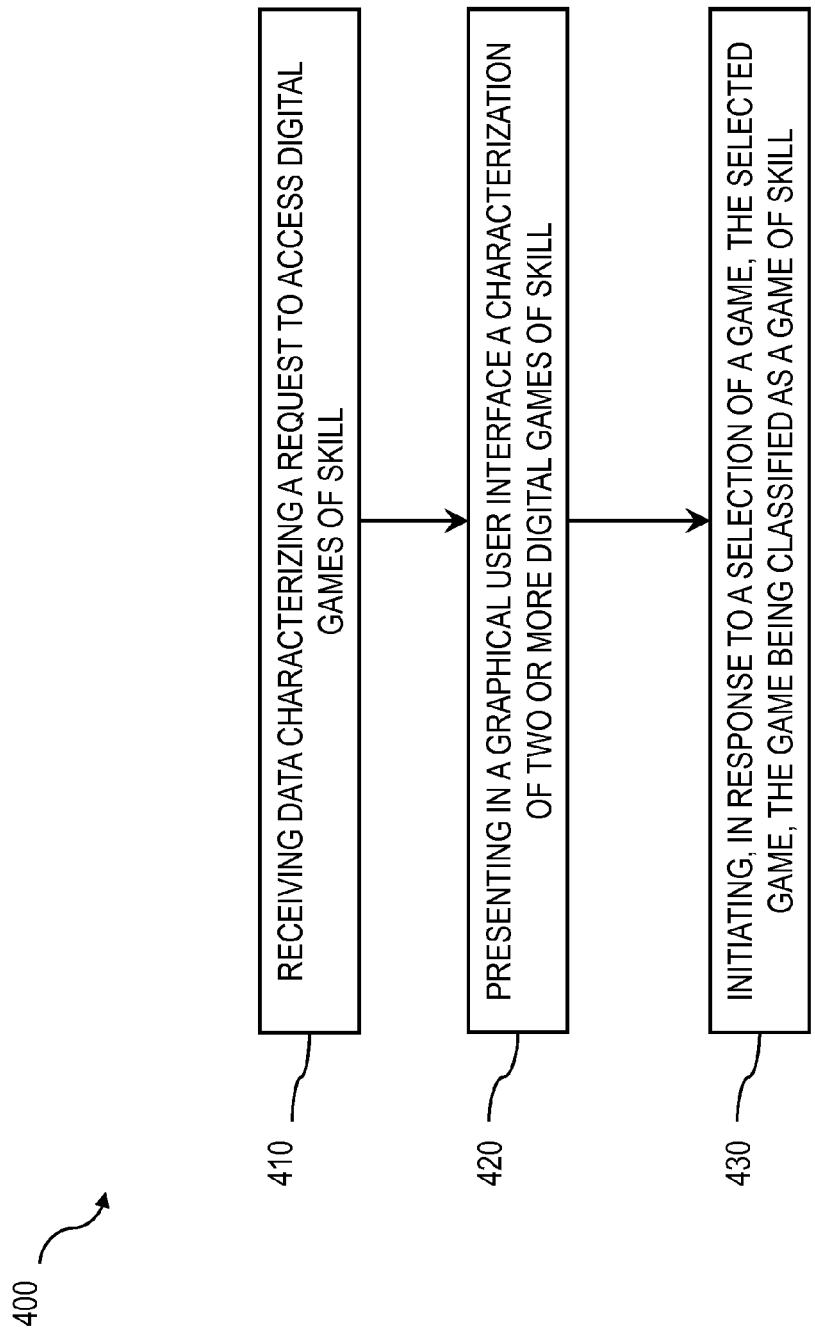
FIG. 4 is a process flow diagram illustrating a process of initiating or providing a classified game of skill to a user.

FIG. 4 is a process flow diagram 400 illustrating a process of initiating or providing a classified game of skill to a user. Data characterizing a request to access digital games of skill is received at 410. A characterization of two or more digital games of skill are presented in a graphical user interface to a user at 420. In response to a selection of a game by the user, the selected game is initiated at 430. The game having been classified as a game of skill as described above.

Figure 5:
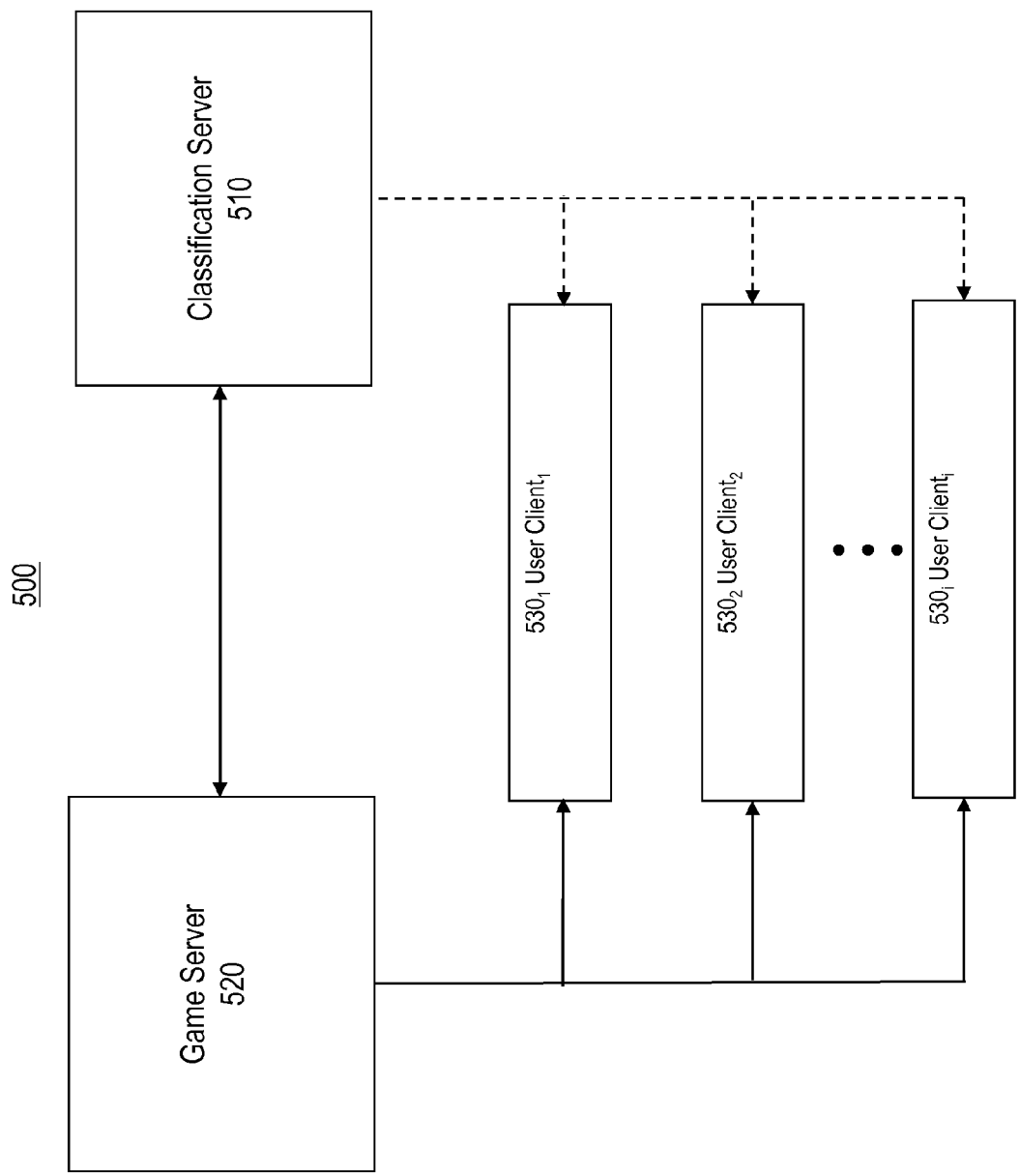
FIG. 5 is a diagram of an implementation of a system for classifying and providing a game of skill to a user.

FIG. 5 is a diagram of an implementation of a system 500 for classifying and providing a game of skill to a user. Classification server 510 is in communication with game server 520. The game server 520 can provide game data necessary to operate a game to a plurality of user clients 330$_i$ (i=1, 2, . . . , N). Each of the plurality of user clients 330$_i$ can include, for example, a mobile device, tablet, computer, videogame console, or other computing system. The classification server 510 can access data characterizing a quantifiable outcome for each of a plurality of game trials either locally, from data previously received from the game server and stored in memory, or can access the data remotely from the game server 520. Classification server 510 can determine, by computing variance measures of the data, a skill factor or dominant factor of the game. The classification server 510 can also classify the game as one of skill or chance. The classification server 510 can provide data characterizing the skill factor or dominant factor to the game server 320 by, for example, transmitting the data to the game server 320. The classification server 310 can provide the data characterizing the skill factor or dominant factor to the user clients $530_i$.

The game server 520 can receive a request to access the game from the user clients $530_i$ and initiate at the user clients $530_i$ a presentation, in a graphical user interface, a characterization of two or more digital games that were classified as a game of skill using the classification server 510. In response to a selection of one of the games of skill, the game server 520 initiates and provides game data for the selected game to enable one or more of the plurality of user clients $530_i$ to play the game.

Example Implementation

In an example implementation, total variance $\sigma^2$ can represent the variation in quantifiable outcome over all game trials, regardless of associated player identity. The mean variance $\bar{s}^2$ can represent the average over all players of the player's own score variance. In a game of pure chance, these quantities will be essentially equal, i.e., the ratio $R:=\bar{s}^2/\sigma^2$ will be 1.

Skill factor S can be defined as:

$$S := 1 - R = \frac{\sigma^2 - \bar{s}^2}{\sigma^2}$$

Skill factor S, which represents variation in performance due to skill, will be zero or near zero for a game of pure chance. In a game of pure skill, S will be greater than zero (R will be less than one). The mean variance $\bar{s}^2$ will be non-negligible because elements such as time of day, state of mind, learning curve, and other non-skill related considerations can influence a particular player's performance. Therefore, S will take some value $S_0$ strictly between zero and one.

Initially, a dataset for a game G comprises m trials or records with a quantifiable outcome and player identifier. If a data entry includes k scores for competing players, that can be treated as k records for each player. The player identifier can include a computer address. The quantifiable outcome or scores can be labeled $x_1$ through $x_m$. The scores for player j are designated $x_{j,1}$ through $x_{j,m_j}$, where $m_j$ is the number of scores associated with player j.

Quantifiable outcome (e.g., score) may not be proportional to player performance. To compensate for the lack of proportionality, scores can be converted to a common scale. In a percentile score, each score can be converted to a number between 0 and 1 reflecting the fraction of scores that are lower than the given one, plus half the fraction that are equal. The following equation can convert a quantifiable outcome $x_1, x_2, \ldots, x_m$ to percentile scores $y_1, y_2, \ldots, y_m$.

$$y_i = \frac{1}{m}\left(|\{j : x_j < x_i\}| + \frac{1}{2}|\{j : x_j = x_i\}|\right)$$

Where i is an index of all trials in a dataset, j is index of players, $x_i$ is the score of the ith trial, m is the total number of score, and $y_i$ is the percentile score. The mean of a set of percentiles is always ½.

The percentile score can be converted to standard-normal using an inverse standard error function according to the following equation.

$$z = \sqrt{2}\,\mathrm{erf}^{-1}(2y-1)$$

Where $z_i$ is the corresponding standard normal score of percentile score $y_i$. The error function is defined as:

$$\mathrm{erf}(x) := \frac{2}{\sqrt{2}} \int_0^x e^{-t^2}\,dt$$

(The normal score $z_i$ can be used interchangeably with $y_i$ in the equations described herein, depending on whether the percentile score or standard normal score is desired.)

A sample variance can be computed according to the following equation.

$$s_j^2 = \frac{1}{m_j - 1}\sum_{k=1}^{m_j}(y_{j,k} - \bar{y}_j)^2 = \frac{1}{m_j-1}\sum_{k=1}^{m_j} y_{j,k}^2 - \frac{m_j}{m_j-1}\bar{y}_j^2$$

Where $s_j^2$ is the sample variance of player j, $m_j$ is the number of trials played by (e.g., associated with) player j, $y_{j,k}$ is the percentile score of the player's kth trial, and $\bar{y}_j$ is the average score. The percentile scores $y_{j,k}$ can be replaced by their standard normal equivalents $z_{j,k}$. If a player has played only one game, (i.e., $m_j=1$), $s_j^2=1$.

The sample variance can be weighted according to the number of trials associated with each player. This gives greater importance to datasets with more trials (and therefore an accurate estimate of the sample variance). Each sample variance $s_j^2$ is a random variable, whose variance, in a game of pure luck, is given by:

$$\mathrm{Var}(s_j^2) = \sigma^4\left(\frac{2}{m_j-1} + \frac{\kappa}{m_j}\right)$$

Where $\kappa$ is the excess kurtosis of the population distribution. If $\mu_4$ is the fourth moment of the population, then $k:=\mu_4/\sigma_4 - 3$. $\kappa$ gives the value 0 for the normal distribution and is negative for the platykurtic uniform distribution. For a standard normal population, the distribution of $s_j^2$ is given by:

$$(m_j - 1)\frac{s_j^2}{\sigma^2} = \chi^2_{m_j-1}$$

Where $\chi$ is the chi-squared distribution. Since $\kappa=0$ and $\sigma^2=1$, the variance formula is $$\mathrm{Var}(s_j^2) = \frac{2}{m_j - 1}$$

Weighting can provide additional accuracy by prioritizing players with a greater number of trials. For any set of weights $w_j$, which sum to 1, the following equation can minimize the variance of $s_j^2$.

$$w_j := \frac{m_j - 1}{\sum_{j=1}^{n} m_j - 1} = \frac{m_j - 1}{m - n}$$

$\bar{s}^2$ can then be computed as:

$$\bar{s}^2 = \sum_{j=1}^{n} w_j s_j^2$$

$$= \frac{1}{m-n} \sum_{j=1}^{n} \sum_{k=1}^{m_j} (y_{j,k}^2 - \bar{y}_j^2)$$

$$= \frac{1}{m-n} \left( \sum_{i=1}^{m} y_i^2 - \sum_{j=1}^{n} \bar{y}_j^2 \right)$$

Using this formulation for $\bar{s}^2$, the variance of the weighted mean is:

$$\text{Var}(\bar{s}^2) = \sum w_j^2 \text{Var}(s_j^2)$$

$$= \sum \frac{(m_j-1)^2}{(m-n)^2} \frac{2}{m_j - 1}$$

$$= \frac{1}{(m-n)^2} \sum 2(m_j - 1)$$

$$= \frac{2}{m-n}$$

The overall population variance $\sigma^2$ can be defined as:

$$\sigma^2 := \frac{1}{m} \sum_{i=1}^{m} y_i^2 - \left( \frac{1}{m} \sum_{i=1}^{m} y_i \right)^2$$

Having both $\bar{s}^2$ and $\sigma^2$ as computed above, the skill factor can then be computed for a given game data set.

In order to determine or classify a game as predominantly skill or predominantly chance, data for a set of games of pure skill is obtained. A skill factor can be computed (described above) for each game in the set and averaged to get a benchmark skill factor $S_0$. For the game to be classified, the data G can be obtained. The skill factor S is computed for the game to be classified and can be compared to $\frac{1}{2}S_0$. The game can be classified as predominately a game of skill if $S > \frac{1}{2}S_0$ and predominantly a game of chance if $S < \frac{1}{2}S_0$. When S and $\frac{1}{2}S_0$ are similar, a confidence measure or probability that the estimate of S is in error can be used to determine if the game should be designated unclassifiable. The statistical variation in S can be assumed to be the same for a game that is predominantly a game of skill or a game of chance. As described above, the variance of the skill factor is:

$$\text{Var}(S) = \text{Var}(R) = \frac{\text{Var}(\bar{s}^2)}{\sigma^4} = \frac{1}{m-n}$$

Games can be unclassifiable if the difference between S and $\frac{1}{2}S_0$ is within two standard deviations from the mean. In other words, games are unclassifiable if the following is true:

$$\left| S - \frac{1}{2} S_0 \right| < \frac{2}{\sqrt{m-n}}$$

If data of a game is unclassifiable, a larger set of data (i.e., more trials) can be obtained. When the game is classifiable, if $S > \frac{1}{2}S_0$, the game is classified as predominantly skill; if $S < \frac{1}{2}S_0$, the game is classified as predominantly chance.

As an example, if the data includes 1000 scores for 100 players, so that the standard deviation of S is $s = 1/(\sqrt{900}) = \frac{1}{30}$. Then $2s = \frac{1}{15}$, and if $S_0 = \frac{1}{2}$, then: if $S \geq \frac{1}{4} + \frac{1}{15} \sim 0.32$, the game is predominantly skill; if $S \leq \frac{1}{4} - \frac{1}{15} \sim 0.18$, the game is predominantly chance; and if $0.18 < S < 0.32$, the game is unclassifiable. If the dataset instead is 10,000 scores for 1000 players, and s shrinks by a factor of $\sqrt{10}$, then: if $S \geq 0.27$, the game is predominantly skill; if $S \leq 0.23$, the game is predominantly chance; and if $0.23 < S < 0.27$, the game is unclassifiable.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method for implementation by one or more processors forming part of at least one computing system, the method comprising:
   accessing, by at least one data processor, data characterizing a quantifiable outcome for a plurality of game trials associated with players and a game, the game being a digital game played on a computing platform operating in a client server relationship and separate from the at least one data processor, the quantifiable outcome is a measurable result of the game;
   computing, using at least one data processor and using the accessed data, variance measures including computing a weighted average of outcome variances of one or more players, the variance measures describing a distribution of outcomes for the plurality of game trials;
   determining, using the variance measures and at least one data processor, whether a dominant factor of game outcome in the game is skill or chance; and
   providing, by at least one data processor, data characterizing the dominant factor.

2. The method of claim 1, further comprising classifying the game as a game of skill or a game of chance.

3. The method of claim 1, wherein the quantifiable outcome of each game trial is independent from all other quantifiable outcomes of the plurality of game trials.

4. The method of claim 1 further comprising determining a confidence level of the skill factor.

5. The method of claim 4, further comprising determining a likelihood a classification of the game as a game of skill or a game of chance is incorrect.

6. The method of claim 5, further comprising classifying the skill factor as unclassifiable.

7. The method of claim 1, wherein computing the variance measures includes computing a percentile score.

8. The method of claim 1, wherein computing the variance measures includes computing a normal distribution.

9. The method of claim 1, wherein computing the variance measures includes computing a sample variance.

10. The method of claim 1, further comprising determining a game skill factor based on a predetermined skill factor of one or more games known to be predominantly skill.

11. The method of claim 1, wherein the computing platform comprises a mobile device, a tablet, or a video game consol.

12. A method for implementation by one or more processors forming part of at least one computing system, the method comprising:
   receiving, by at least one data processor, data characterizing a request to access digital games of skill;
   presenting, using at least one data processor and in a graphical user interface, a characterization of two or more digital games of skill; and
   initiating, using at least one data processor and in response to a selection of one of the games, the selected game;
   wherein the games are classified as games of skill by:
      accessing, by at least one data processor, data characterizing a quantifiable outcome for a plurality of game trials associated with players and a game, the game being a digital game played on a computing platform operating in a client server relationship and separate from the at least one data processor, the quantifiable outcome is a measurable result of the game;
      computing, using at least one data processor and using the accessed data, variance measures including computing a weighted average of outcome variances of one or more players;
      determining, using the variance measures, whether a dominant factor of game outcome in the game is skill or chance; and
      providing, by at least one data processor, data characterizing the dominant factor.

13. The method of claim 12, wherein computing the variance measures includes one or more of: computing a percentile score, computing a normal distribution, and computing a sample variance.

14. A non-transitory computer program product storing instructions, which when executed by at least one data processor of at least one computing system, implement a method comprising:
   accessing, by at least one data processor, data characterizing a quantifiable outcome for a plurality of game trials associated with players and a game, the game being a digital game played on a computing platform operating in a client server relationship and separate from the at least one data processor, the quantifiable outcome is a measurable result of the game;
   computing, using at least one data processor and using the accessed data, variance measures including computing a weighted average of outcome variances of one or more players, the variance measures describing a distribution of outcomes for the plurality of game trials;
   determining, using the variance measures and at least one data processor, whether a dominant factor of game outcome in the game is skill or chance; and
   providing, by at least one data processor, data characterizing the dominant factor.

15. The non-transitory computer program product of claim 14, further comprising classifying the game as a game of skill or a game of chance.

16. The non-transitory computer program product of claim 14, wherein the quantifiable outcome of each game trial is independent from all other quantifiable outcomes of the plurality of game trials.

17. A non-transitory computer program product storing instructions, which when executed by at least one data processor of at least one computing system, implement a method comprising:
   receiving, by at least one data processor, data characterizing a request to access digital games of skill;
   presenting, using at least one data processor and in a graphical user interface, a characterization of two or more digital games of skill; and
   initiating, using at least one data processor and in response to a selection of one of the games, the selected game;
   wherein the games are classified as games of skill by:
      accessing, by at least one data processor, data characterizing a quantifiable outcome for a plurality of game trials associated with players and a game, the game being a digital game played on a computing platform operating in a client server relationship and separate from the at least one data processor, the quantifiable outcome is a measurable result of the game;

computing, using at least one data processor and using the accessed data, variance measures including computing a weighted average of outcome variances of one or more players, the variance measures describing a distribution of outcomes for the plurality of game trials;

determining, using the variance measures, whether a dominant factor of game outcome in the game is skill or chance; and providing, by at least one data processor, data characterizing the dominant factor.

18. The non-transitory computer program product of claim 17, wherein computing the variance measures includes one or more of: computing a percentile score, computing a normal distribution, and computing a sample variance.

19. A system comprising:
at least one data processor;
memory storing instructions which, when executed by the at least one data processor, causes the at least one data processor to perform operations comprising:

accessing, by at least one data processor, data characterizing a quantifiable outcome for a plurality of game trials associated with players and a game, the game being a digital game played on a computing platform operating in a client server relationship and separate from the at least one data processor, the quantifiable outcome is a measurable result of the game;

computing, using at least one data processor and using the accessed data, variance measures including computing a weighted average of outcome variances of one or more players, the variance measures describing a distribution of outcomes for the plurality of game trials;

determining, using the variance measures and at least one data processor, whether a dominant factor of game outcome in the game is skill or chance; and providing, by at least one data processor, data characterizing the dominant factor.

20. The system of claim 19, further comprising classifying the game as a game of skill or a game of chance.

* * * * *